United States Patent
Gardner, Jr. et al.

(10) Patent No.: US 7,401,761 B2
(45) Date of Patent: Jul. 22, 2008

(54) COMPRESSED GAS CYLINDER SAFETY DEVICE

(75) Inventors: William Gardner, Jr., Latrobe, PA (US); Danial S. Jones, Latrobe, PA (US)

(73) Assignee: Smart Parts, Inc., Latrobe, PA (US)

( * ) Notice: Subject to any disclaimer, the term of this patent is extended or adjusted under 35 U.S.C. 154(b) by 156 days.

(21) Appl. No.: 11/125,724

(22) Filed: May 9, 2005

(65) Prior Publication Data

US 2005/0253105 A1    Nov. 17, 2005

Related U.S. Application Data

(60) Provisional application No. 60/571,006, filed on May 13, 2004.

(51) Int. Cl.
*F16K 51/00* (2006.01)
(52) U.S. Cl. .................. 251/144; 251/344
(58) Field of Classification Search .......... 251/144, 251/343, 344, 345; 222/3, 4, 400.7
See application file for complete search history.

(56) References Cited

U.S. PATENT DOCUMENTS

| | | | | |
|---|---|---|---|---|
| 1,519,067 A | | 12/1924 | Smith | 29/256 |
| 3,098,386 A | * | 7/1963 | Kennepohl | 73/297 |
| 3,755,876 A | | 9/1973 | Beasley | 29/890.121 |
| RE27,895 E | | 1/1974 | Ray | 29/213.1 |
| 3,910,572 A | * | 10/1975 | Denler | 482/49 |
| 3,948,481 A | * | 4/1976 | Pollock | 251/351 |
| 4,314,689 A | * | 2/1982 | Wilson | 251/351 |
| 4,529,167 A | * | 7/1985 | Harrison et al. | 251/144 |
| 4,706,357 A | | 11/1987 | Ewing | 29/213.1 |
| 4,708,171 A | * | 11/1987 | Cudaback | 137/588 |
| 4,893,651 A | * | 1/1990 | Herman et al. | 137/588 |
| 5,368,181 A | * | 11/1994 | Myers | 220/303 |
| 5,842,260 A | | 12/1998 | Todd, III et al. | 29/213.1 |
| 6,244,572 B1 | * | 6/2001 | Delsole | 261/38 |
| 7,163,008 B2 | * | 1/2007 | Stevens | 124/73 |

OTHER PUBLICATIONS

Consumer Products Safety Commission (CPSC) at http://www.cpsc.gov/CPSCPUB/PREREL/prhtml04/04105.html, pp. 5.

* cited by examiner

*Primary Examiner*—John K Fristoe, Jr.
(74) *Attorney, Agent, or Firm*—Simple IP Law, P.C.

(57) ABSTRACT

An improved apparatus and method for preventing accidental disconnection of a valve fitting from a compressed gas cylinder (tank) is provided. A valve safety device preferably includes a valve stem having a first threaded section. The first threaded section is preferably configured to engage threads in an internal section of a compressed gas storage device during insertion and reside within an internal portion of the compressed gas storage device following insertion. A non-threaded section is preferably arranged proximal to the first threaded section. One or more vents are preferably provided on the non-threaded section to provide for a safe release of compressed gas from the compressed gas storage device before the first threaded section can be removed from the compressed gas storage device.

16 Claims, 5 Drawing Sheets

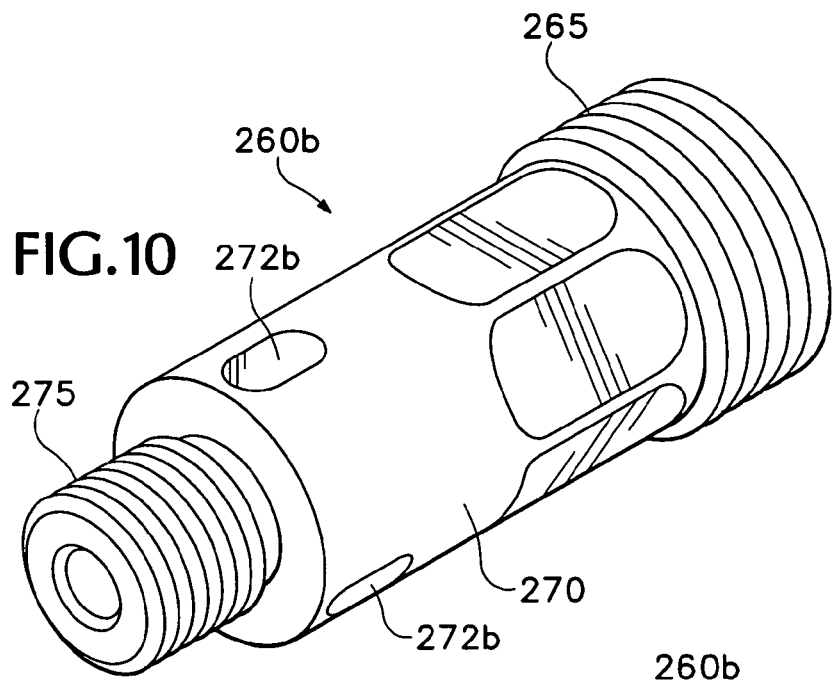
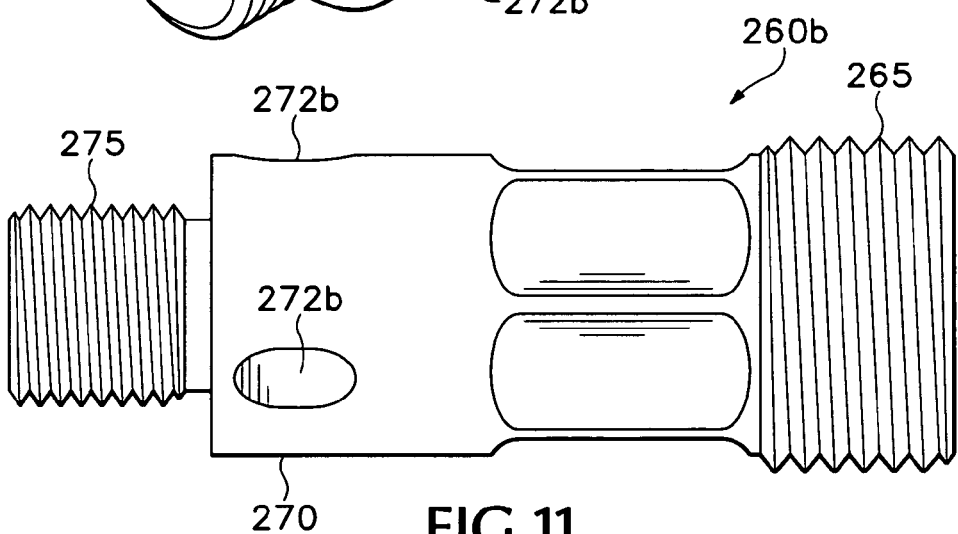
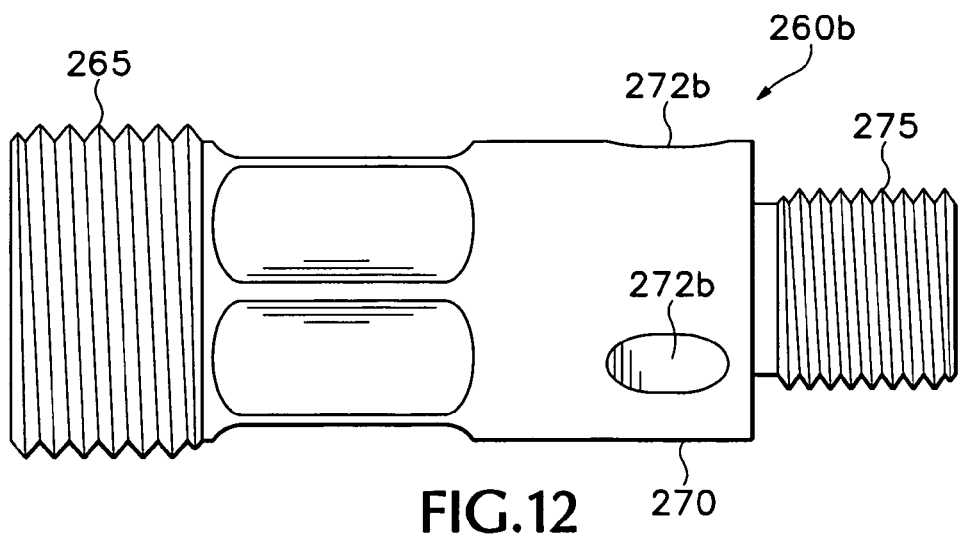

COMPRESSED GAS CYLINDER SAFETY DEVICE

This application claims priority from U.S. Provisional Patent Application Ser. No. 60/571,006, filed May 13, 2004, the contents of which are hereby incorporated herein by reference in their entirety.

BACKGROUND OF THE INVENTION

1. Field of the Invention

This invention relates generally to compressed gas storage devices. More particularly, however, this invention relates to methods and devices for safely connecting a release valve to the storage device.

2. Background Issues and Related Art

The use of compressed gases in paintball and other activities can present several safety hazards. Compressed gas cylinders, for example, pose certain safety hazards simply because they contain gas under pressure. Regardless of the properties of the gas, any gas under pressure can explode if the cylinder in which it is contained is improperly stored or handled. Pressurization of a cylinder creates a potential hazard even for inert gases. A typical cylinder pressurized to 2000 psi, for example, contains energy equivalent to nearly one and a half pounds of TNT. Failure of the cylinder and/or valve can therefore create an extremely dangerous projectile.

Specifically, rapid release of stored gases can cause the storage container to act as a projectile. For this reason, improperly releasing the gas from a compressed gas cylinder is extremely dangerous. Compressed gas storage cylinders, regardless of whether they are made of aluminum, some other metal, or a composite fiber are hard and heavy. A sudden release of the gas can cause the cylinder to become a missile-like projectile, with devastating consequences. Compressed gas cylinders have been known, for example, to penetrate concrete-block walls and severely injure or kill people.

In the sport of paintball, compressed gas cylinders are used to provide a supply of compressed gas for propelling paintballs from paintball markers (or guns). FIG. 1 illustrates a conventional carbon dioxide ($CO_2$) cylinder 150 connected to a paintball gun 100 through a release valve 155.

Referring to FIG. 1, compressed gas storage tanks typically include a valve fitting 155 (generally brass) attached to an aluminum or wrapped carbon fiber compressed gas storage tank 150 (also referred to as a "cylinder," "bottle," or "canister"). The valve fitting 155 is typically secured into the bottle 150 via a threaded connection. The valve fitting 155 generally provides an additional threaded connection on its opposite end between the compressed gas cylinder and the paintball gun. Unfortunately, the failure of the valve fitting 155 itself or of its connection to the storage tank 150 can result in a rapid release of compressed gas from the cylinder 150, creating a potentially lethal projectile.

As reported by the Consumer Products Safety Commission (CPSC) at http://www.cpsc.gov/CPSCPUB/PREREL/prhtml04/04105.html, failure of the valve fitting 155 may result when the bottle 150 is removed from the paintball gun 100. If the user is not particularly careful in ensuring that the valve fitting 155 turns with the bottle 150, the bottle 150 may be unscrewed from the valve fitting 155, thereby resulting in the rapid release of any remaining compressed gas. In this circumstance, the bottle 150 may be launched from the paintball gun 100. At least two deaths are known to have resulted from this occurrence.

FIG. 2 is a close-up view of the conventional valve fitting 155 between the $CO_2$ bottle 150 and the receptacle on the paintball gun 100. When removing the compressed gas tank 150 from the paintball gun 100, the valve fitting 155 must remain connected to the cylinder 150 to prevent the potentially deadly expulsion of the tank from the gun 100.

Although loctite or some other adhesive may be used to more rigidly secure the threaded connection between the valve fitting 155 and the bottle 150, the connection can wear down over time or users may tamper with it in an attempt to modify the bottle connection. In addition, the compressed gas cylinders 150 may be dropped or jarred in a way that might loosen or destroy the valve connection to the bottle 150.

The CPSC has recommended painting lines from the valve to the bottle to ensure that they remain aligned during bottle removal from the paintball gun. FIGS. 3 and 4 illustrate this method of ensuring proper alignment between the bottle 150 and the valve 155. Referring to FIG. 3, a painted line 160 indicates proper alignment between the valve fitting 155 and the bottle 150. Referring to FIG. 4, if the line 160a painted on the valve fitting 155 becomes unaligned with the line 160b painted on the bottle 150, this alerts the user that the valve fitting 155 and bottle 150 are becoming disconnected.

While this solution helps prevent a user from accidentally unscrewing the bottle 150 from the valve fitting 155, it requires attentiveness by the user and does not solve problems resulting from other valve failures, such as those resulting from dropped or jarred cylinders. What is needed is a way to better prevent the uncontrolled release of compressed gas from the compressed gas tank resulting from the failure of the valve/bottle connection.

SUMMARY OF THE INVENTION

According to a preferred embodiment of the present invention, an improved apparatus and method for preventing accidental disconnection of a valve fitting from a compressed gas cylinder (tank) is provided. A valve safety device (or "launchless safety device") preferably includes a valve stem having multiple threaded sections. First and second threaded sections are preferably arranged on opposite ends of the valve stem. A non-threaded section is preferably arranged between the first and second threaded sections.

The first and second threaded sections can be preferably configured to threadingly engage the compressed gas cylinder. Alternatively, the second threaded section can engage an on/off valve, with threads on the on/off valve configured to engage the gas cylinder. A third threaded section is preferably arranged on the on/off valve (if provided), or on a conventional cylinder valve to engage a paintball gun receptacle (or other compressed gas operated device).

The first threaded section of the valve stem is preferably threaded into the compressed gas cylinder so that the threaded section becomes arranged entirely within a central area of the cylinder and no longer engages the internal bottle threads. The second threaded section can then be threaded into the cylinder. Vents are preferably arranged at a position along the non-threaded section between the first and second threaded sections to vent compressed gas from the interior of the cylinder before the first threaded section can be removed from the cylinder. The first threaded section can be reverse threaded with respect to the second threaded section to ensure that the first threaded section cannot become accidentally removed from the cylinder. Reverse threading, loctite, and/or other connection methods can be employed between the on/off valve and the valve stem to prevent accidental removal of the on/off valve from the valve stem.

The safety device preferably prevents the tank from becoming a projectile by ensuring a safe release of the compressed gas before the valve stem is completely removed from the tank. More particularly, if the connection between the on/off valve (or conventional valve) and the tank becomes disengaged, either by unscrewing the valve or by dropping the tank, the first threaded section of the valve stem prevents the valve and stem assembly from completely disengaging from the tank until any compressed gas remaining in the tank is safely vented. More specifically, the vents arranged on the non-threaded portion of the valve stem preferably release the compressed gas from the tank before the first threaded section of the valve stem can be removed from the tank. In addition, the configuration of the vents can provide for a controlled release of the compressed gas to ensure that the tank does not operate as a projectile even if the threaded connection with the valve and/or the paintball gun becomes disengaged.

BRIEF DESCRIPTION OF THE DRAWINGS

The foregoing objects, features, and advantages of the present invention will become more readily apparent from the following detailed description of preferred embodiments thereof, made with reference to the accompanying figures, in which:

FIG. 10 is a somewhat schematic perspective view of the valve safety device of FIG. 9;

FIG. 11 is a somewhat schematic side view of the valve safety device of FIG. 10; and FIG. 12 is a somewhat schematic opposing side view of the valve safety device of FIG. 11.

DETAILED DESCRIPTION OF PREFERRED EMBODIMENTS

Figure 1:
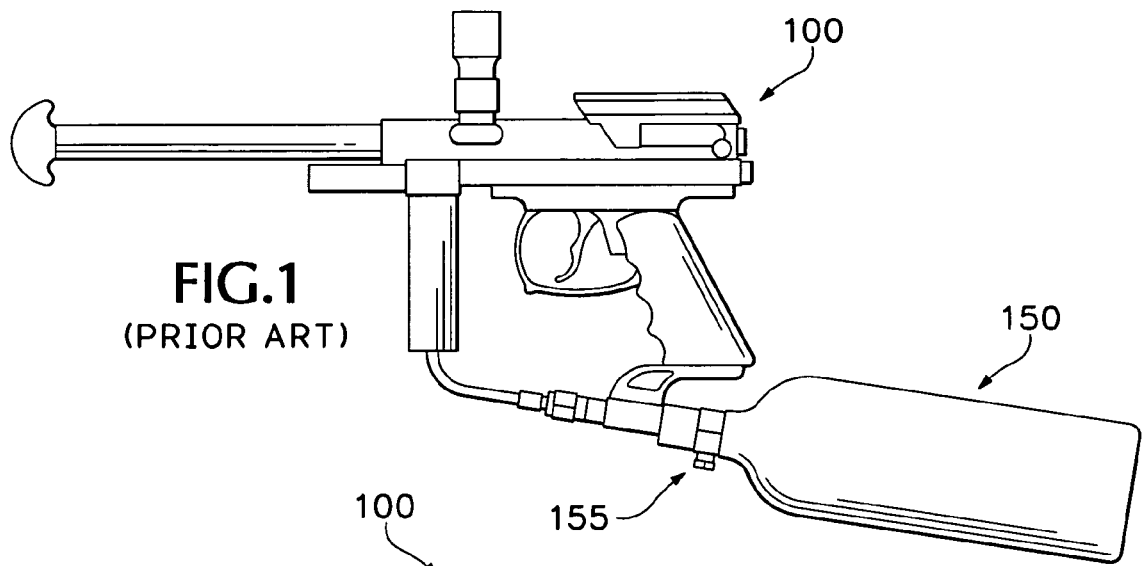
FIG. 1 is a schematic side view of a conventional compressed gas cylinder and valve fitting connected to a paintball gun.
Figure 2:
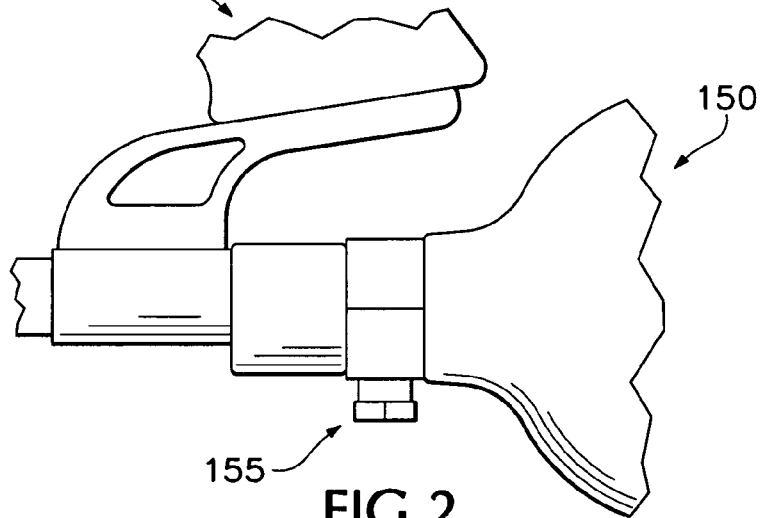
FIG. 2 is a somewhat schematic enlarged side view showing a connection between the compressed gas cylinder, valve fitting, and paintball gun of FIG. 1.
Figure 3:
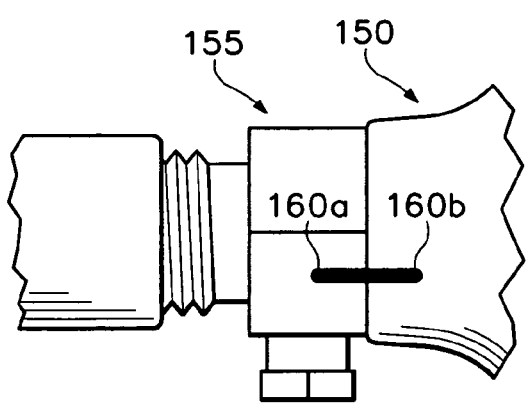
FIG. 3 is a somewhat schematic side view of a compressed gas cylinder and valve fitting illustrating a conventional method of preventing accidental disengagement between the cylinder and valve fitting.
Figure 4:
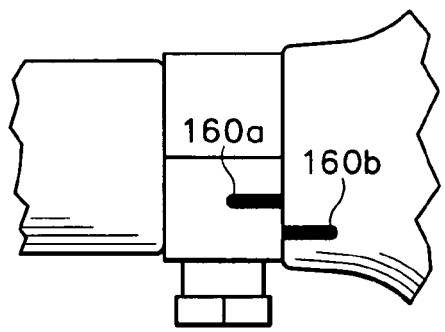
FIG. 4 is a somewhat schematic side view of the compressed gas cylinder and valve fitting of FIG. 3, further illustrating the conventional method of preventing accidental disengagement between the cylinder and valve fitting.
Figure 5:
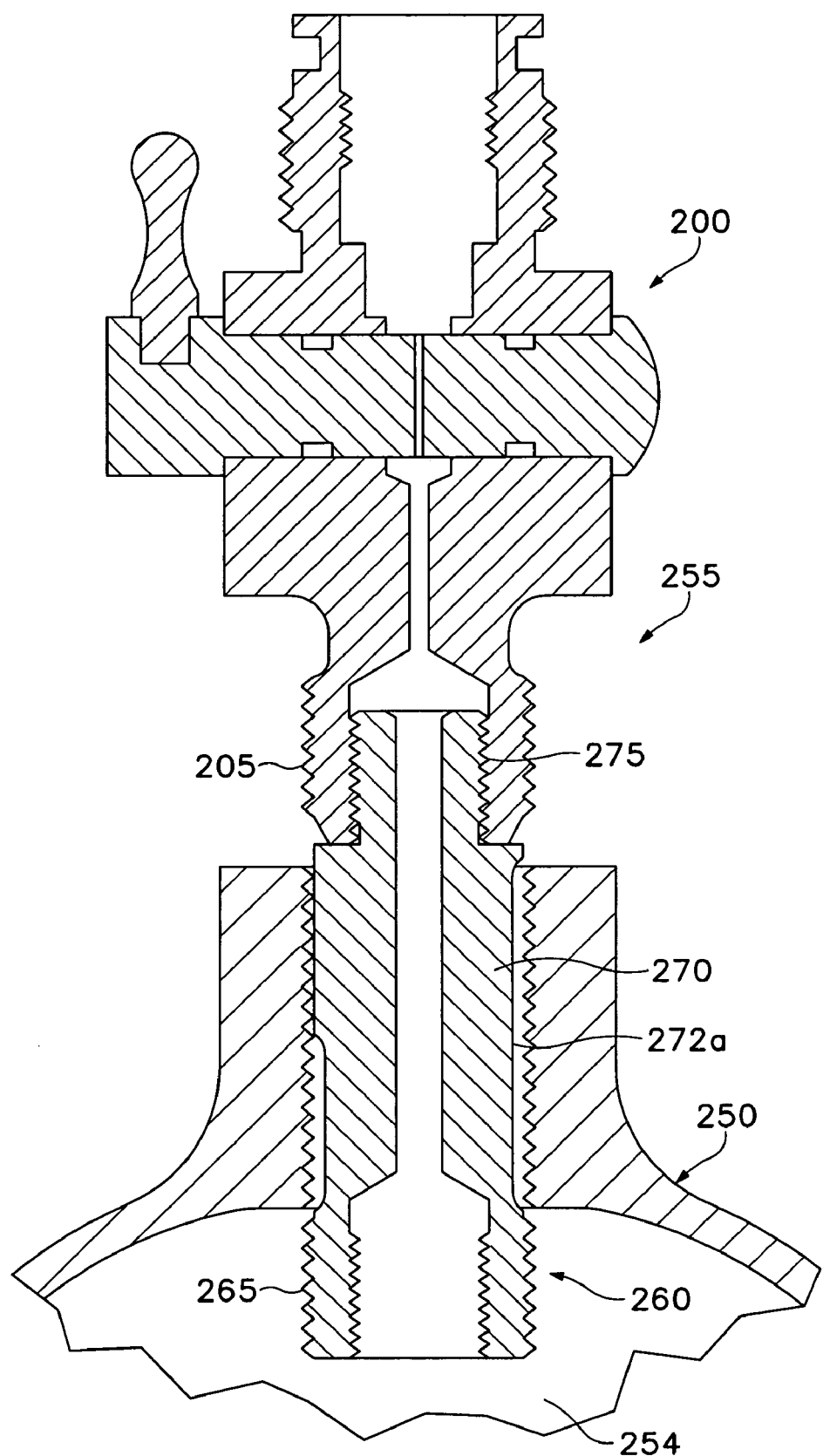
FIG. 5 is a somewhat schematic cross sectional side view of a valve safety device according to a preferred embodiment of the present invention, shown attached to a compressed gas cylinder and an on/off valve.

As identified above, the accompanying drawings show the construction of various preferred embodiments of the present inventive concepts. Referring first to FIG. 5, a valve safety device 255, according to one aspect of the present invention, preferably includes a valve stem 260 and an on/off valve assembly 200. The valve safety device 255 is shown with an on/off valve 200 connected to a compressed gas storage cylinder 250. In FIG. 5, the valve safety device 255 is shown in a partially removed position with respect to a compressed gas cylinder 250 in order to more fully illustrate various concepts of the present invention.

In other embodiments (not shown), the on/off valve can be omitted and the safety device can be constructed as a single piece with the bottle valve threads arranged on the exposed end of the safety device mating directly with a bottle receptacle on a paintball gun or other device configured to utilize compressed gas. The on/off valve could also be integrally formed with the valve stem. The remainder of the safety device can be constructed in a manner similar to the primary preferred embodiment.

Figure 9:
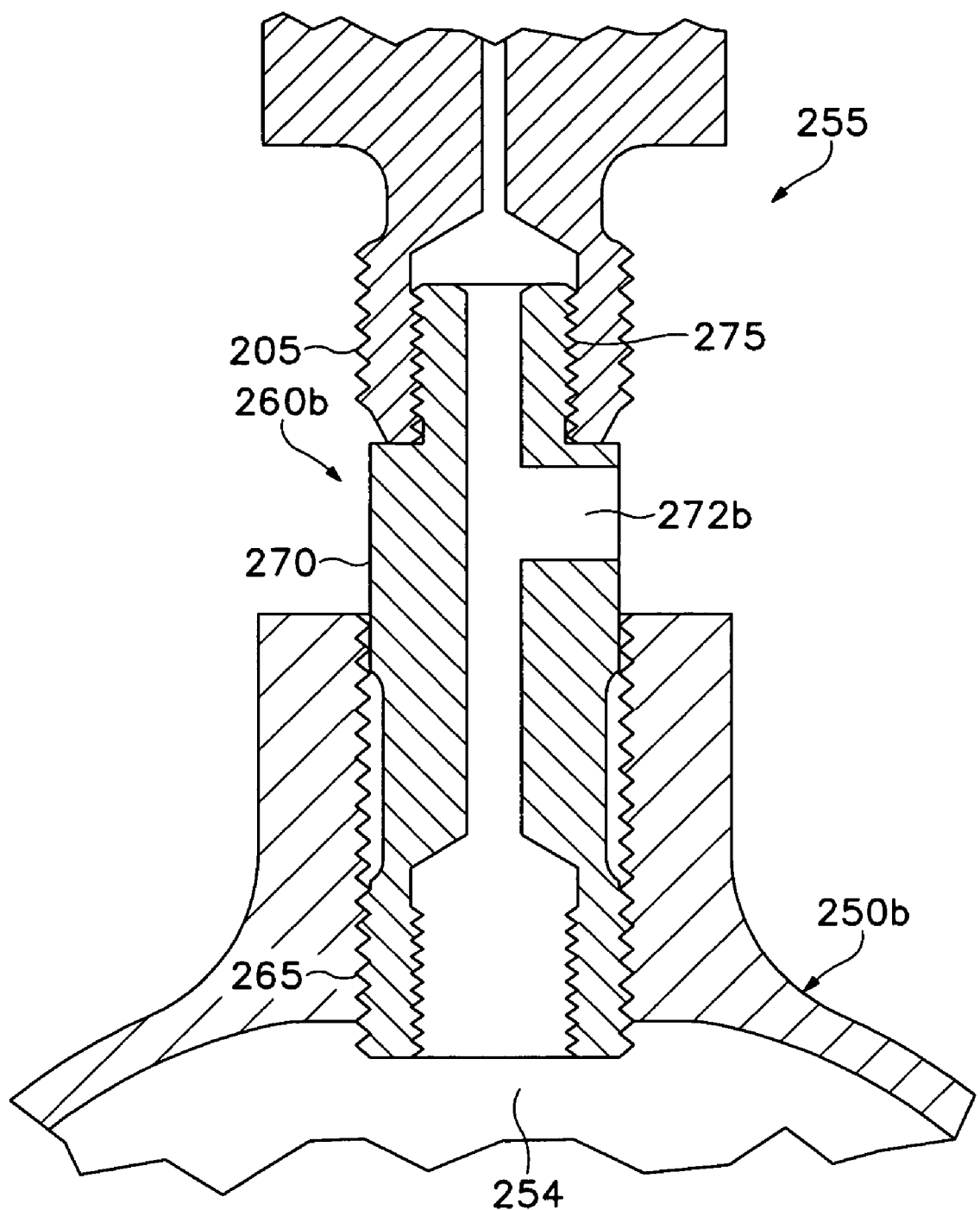
FIG. 9 is a somewhat schematic cross sectional side view of a valve safety device having vents for releasing compressed gas in a controlled manner, according to another embodiment of the present invention, shown attached to a compressed gas cylinder and an on/off valve.

In the embodiment illustrated in FIG. 5, the valve stem 260 preferably includes a first threaded section 265, an elongated, non-threaded section 270, and a second threaded section 275. The first threaded section 265 is preferably configured to engage the threads 252 inside the neck of the compressed gas bottle 250. The elongated, non-threaded section 270 is preferably configured to vent any compressed gas remaining in the bottle before the first threaded section is removed from the bottle. This can be accomplished, for example, using vent channels 272a arranged along an outer surface of the safety device or vent holes 272b (see FIG. 9) arranged through the safety device. The second threaded section 275 is preferably configured to engage an on/off valve assembly 260 but could alternatively be configured, for example, with a conventional bottle valve (not shown) to thread directly into a tank receptacle of a pneumatic paintball gun or other compressed gas device.

To provide a compressed gas tank with the safety device 255 according to the embodiment shown in FIG. 5, the first threaded section 265 of the valve stem 260 is preferably threaded into the compressed gas storage tank 250. The on/off valve 200 is preferably already threaded onto and secured to the opposite end 275 of the valve stem 260. A lower threaded section 205 of the on/off valve 200 is then preferably threaded into and secured to the tank 250. The first threaded section 265 of the valve stem 260 preferably becomes arranged entirely within a central area 254 of the tank 250, so that it no longer engages the internal bottle threads 252. Reverse threading and/or permanent or semi-permanent connection methods can be used to help ensure that removing the on/off valve 200 and valve safety device 255 from the bottle 250 does not separate the on/off valve 200 from the valve stem 260. The first and second threads 265, 275, respectively, for example, can be reverse threaded with respect to each other.

The safety device 255 preferably prevents the tank 250 from becoming a projectile by ensuring a safe release of the compressed gas before the valve safety device 255 is completely removed from the tank 250. More particularly, if the threaded connection between the on/off valve 200 and the tank 250 becomes disengaged, either by unscrewing the on/off valve 200 or by dropping the tank, the first threaded section 265 of the valve stem 260 prevents the valve stem 260 from disengaging from the tank 250 while safely venting any compressed gas remaining in the tank 250. Vents 272a, 272b arranged on the non-threaded portion 270 of the valve stem 260 preferably release the compressed gas from the tank 250 before the first threaded section 265 of the valve stem 260 can be removed from the tank 250. The configuration of the vents 272a, 272b can further provide for a controlled release of the compressed gas to ensure that the tank 250 does not operate as a projectile even if the threaded connection with the on/off valve 200 and/or the paintball gun (not shown) becomes disengaged.

Figure 6:
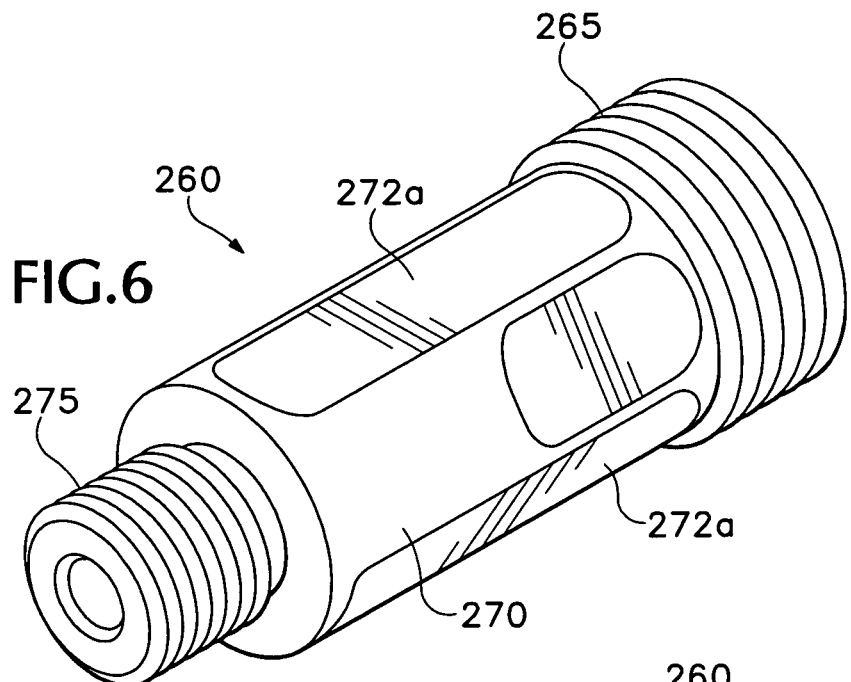
FIG. 6 is a somewhat schematic perspective view of the valve safety device of FIG. 5, shown removed from the compressed gas cylinder and on/off valve.
Figure 7:
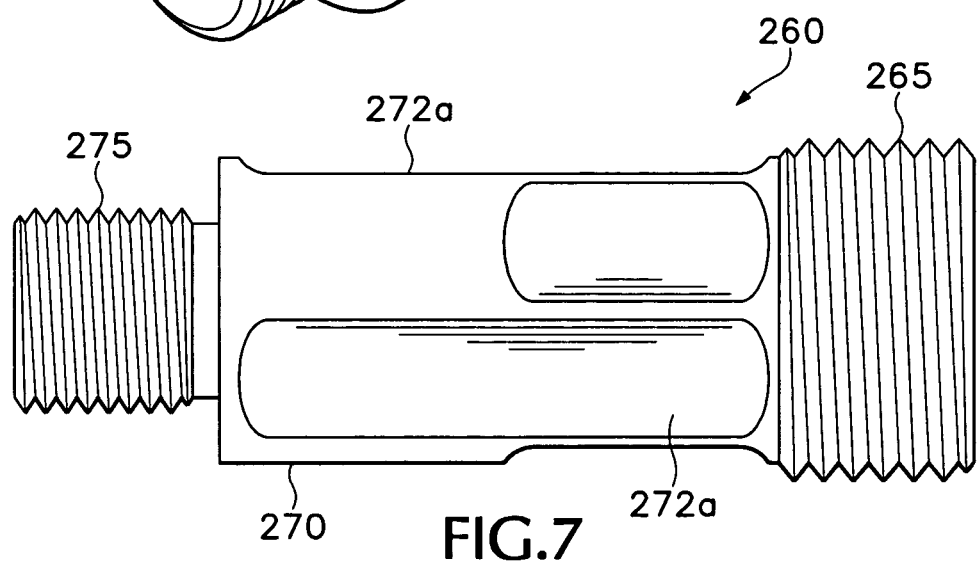
FIG. 7 is a somewhat schematic side view of the valve safety device of FIG. 6.
Figure 8:
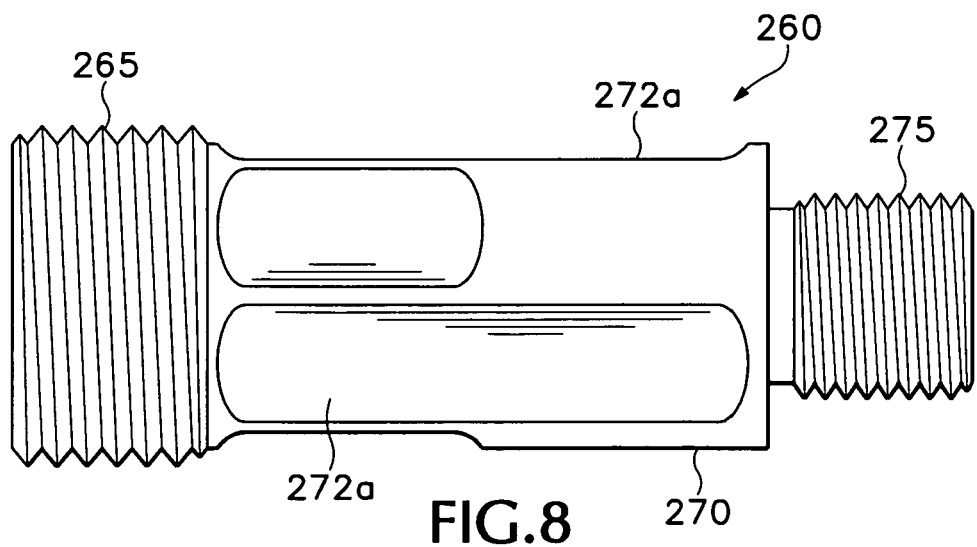
FIG. 8 is a somewhat schematic opposing side view of the valve safety device of FIG. 7.

FIGS. 6-8 are various views of a valve stem 260 for a launchless safety device 255 according to one embodiment of the present invention. The embodiment shown in FIGS. 6-8 is specifically designed for CO2 tanks. The preferred CO2 tank embodiment illustrated in these figures preferably fits most bottle valves by including a ⅛ NPT threaded tip. This embodiment also preferably retains the ability to use CO2 anti-siphon tubes in the bottle to prevent liquid CO2 from entering the paintball gun or other compressed gas operated device. In this embodiment, vent grooves or channels 272 are preferably arranged along sides of the valve stem 260 to vent compressed gas from the cylinder 250 before the valve stem 260 can be removed from the cylinder 250.

FIGS. 9-12 are various views of a valve stem 260*b* for a launchless safety device 255 according to a still further embodiment of the present invention. The embodiment illustrated in FIGS. 9-12 is preferably configured for use with compressed air/nitrogen tanks 250*b*. Referring to FIGS. 9-12, the compressed air/nitrogen embodiment 260*b* is preferably configured to vent the high pressure gas directly to atmosphere in a balanced manner. More specifically, vents 272*b* are preferably provided through the non-threaded portion 270 of the valve stem 260*b*.

Most preferably, the vents 272*b* are preferably arranged equidistantly along the circumference of the valve stem 260*b* to vent compressed gas from the interior of the valve stem 260*b* to atmosphere in a balanced manner. This specific embodiment includes three vent holes 272*b* arranged in the non-threaded section 270 equidistantly along the circumference of the valve stem 260*b*. Providing the compressed air with a balanced direct exhaust prevents the creation of a propulsion force that would cause the bottle to act as a potentially deadly projectile.

Although various preferred embodiments are shown and/or described in the accompanying description and drawings, various alternative embodiments will be readily apparent to those skilled in the art based on the foregoing description and accompanying drawings. The invention is therefore not limited to the disclosed embodiments, but should be interpreted to cover all modifications and variations falling within the spirit of the inventive principles disclosed herein.

What is claimed is:

1. A valve safety device for a compressed gas storage device having a compressed gas storage chamber arranged in an interior portion of the compressed gas storage device, an opening communicating with the compressed gas storage chamber, and internal threads arranged in the opening, said valve safety device comprising:
   a valve stem having a first threaded section and a non-threaded section;
   wherein the first threaded section engages the internal threads of the compressed gas storage device during insertion of the valve stem into the compressed gas storage device, and wherein the first threaded section is at least partly arranged within the interior portion of the compressed gas storage device following insertion; and
   one or more vents arranged along the non-threaded section that release the compressed gas from the compressed gas storage chamber before the first threaded section can be removed from the compressed gas storage device.

2. A device according to claim 1, further comprising an on/off valve arranged on the valve stem opposite the first threaded section.

3. A device according to claim 2, wherein the on/off valve comprises a threaded section that threadingly engages the internal threads of the compressed gas storage device.

4. A device according to claim 2, wherein the on/off valve is threadingly connected to a second threaded section of the valve stem.

5. A device according to claim 1, further comprising a second threaded section arranged on the valve stem and separated from the first threaded section.

6. A device according to claim 5, wherein the second threaded section is in threaded engagement with the internal threads of the compressed gas storage device following insertion of the valve stem into the compressed gas storage device.

7. A device according to claim 6, further comprising a valve connection member arranged proximal to the second threaded section, wherein said valve connection member mates within a receptacle of a connected compressed gas operated device.

8. A device according to claim 1, wherein the vents comprise vent channels formed along sides of the valve stem.

9. A device according to claim 1, wherein the first threaded section is arranged entirely within the interior portion of the compressed gas storage device following insertion.

10. A valve safety device, comprising:
    a valve stem;
    a first threaded section arranged on one end of the valve stem;
    a second threaded section arranged on an opposite end of the valve stem; and
    a non-threaded section arranged between the first threaded section and the second threaded section, wherein the non-threaded section extends into an internal area of a compressed gas storage device when the valve stem is fitted in the compressed gas storage device, wherein the valve stem further comprises one or more vents arranged in the non-threaded portion of the valve stem.

11. A device according to claim 10, wherein the one or more vents comprises a vent hole arranged through the valve stem to communicate compressed gas from an interior of the valve stem to atmosphere when the valve stem is partially removed from the compressed gas storage device.

12. A device according to claim 11, wherein the one or more vents comprises a plurality of vent holes arranged equidistantly around the valve stem to provide for a balanced release of compressed gas through the valve stem.

13. A device according to claim 10, wherein the one or more vents comprises a vent channel formed along the non-threaded portion of the valve stem.

14. A device according to claim 10, wherein the second threaded section is attached to an on/off valve.

15. A valve safety stem for a compressed gas storage device having a compressed gas storage chamber arranged in an interior portion of the compressed gas storage device, an opening communicating with the compressed gas storage chamber, and internal threads arranged in the opening, said valve safety stem comprising:
    a first threaded section arranged on the valve stem, wherein said first threaded section engages internal threads of the compressed gas storage device during insertion into the compressed gas storage device; and
    one or more vents arranged on the valve stem to vent compressed gas from within the compressed gas storage chamber of the compressed gas storage device before the first threaded section is completely removed from the compressed gas storage device, further comprising a second threaded section arranged on the valve stem, further comprising a non-threaded section arranged between the first and second threaded section, whereon the one or more vents are arranged on the non-threaded section.

16. A valve safety stem according to claim 15, wherein said first threaded section is arranged within the compressed gas storage device when the valve safety stem is fully inserted in the compressed gas storage device.

* * * * *